Dec. 19, 1933.  M. G. FIEDLER  1,940,298
FUEL INJECTION APPARATUS
Filed Aug. 14, 1930  2 Sheets-Sheet 1

Inventor:
Max George Fiedler
By F. DeWitt Goodwin
Attorney

Patented Dec. 19, 1933

1,940,298

UNITED STATES PATENT OFFICE 1,940,298

FUEL INJECTION APPARATUS

Max George Fiedler, Philadelphia, Pa., assignor to Reo Motor Car Company, a corporation of Michigan Application August 14, 1930. Serial No. 475,279

9 Claims. (Cl. 123—139)

My invention relates to a fuel injection apparatus particularly adapted for use in connection with oil burning engines of the Diesel type, in which fuel is supplied to the fuel injection valves or nozzles at a constant high pressure so that when the nozzle is opened the fuel will enter the cylinder containing air under pressure.

The object of my invention is to provide an apparatus in which the fuel is maintained at a relatively low pressure, which is not sufficient to open the fuel injection nozzle, and to provide means in the apparatus for circulating the fuel through a reservoir, or system of pipes, or passageways, at a high velocity and provide means for interrupting the flow of the fuel, thus causing a sudden increase in the pressure which will be sufficient to open the fuel injection nozzle for admitting the fuel to the cylinder of the engine; a further object is to provide means for subjecting the fuel to pressure, which means is preferably in the form of a gear pump having two pumping stages for placing the fuel under pressure; a further object is to provide means, preferably in the form of a gear pump, which is operated at a higher speed than the pressure pump, for the purpose of setting up a rapid flow or circulation of the fuel through the reservoir, or system, and maintaining the flow at a constant speed; a still further object is to provide a reservoir, or system of pipes, or passageways, which is of sufficient length to permit the rate of flow to be maintained at a high speed; a still further object is to provide a device for interrupting the flow, or circulation of the fuel through the reservoir, thereby suddenly increasing the pressure to a high point which will operate the fuel inject' in nozzles; a still further object is to provide a distributor, or timer, for directing the flow of the fuel, at the moment of the increase in the pressure, to the different cylinders of the engine successively; and a still further object is to provide a pressure regulator in the return passageway from the interrupter to the pumps so that the stopping of the flow of fuel in the chamber 36 is replaced by the contents of the accumulator chamber 74 of the regulator will not effect the pressure in the pump passageway 24.

These together with various other novel features of construction and arrangement of the parts, which will be more fully hereinafter described and claimed, constitute my invention.

Figure 1:
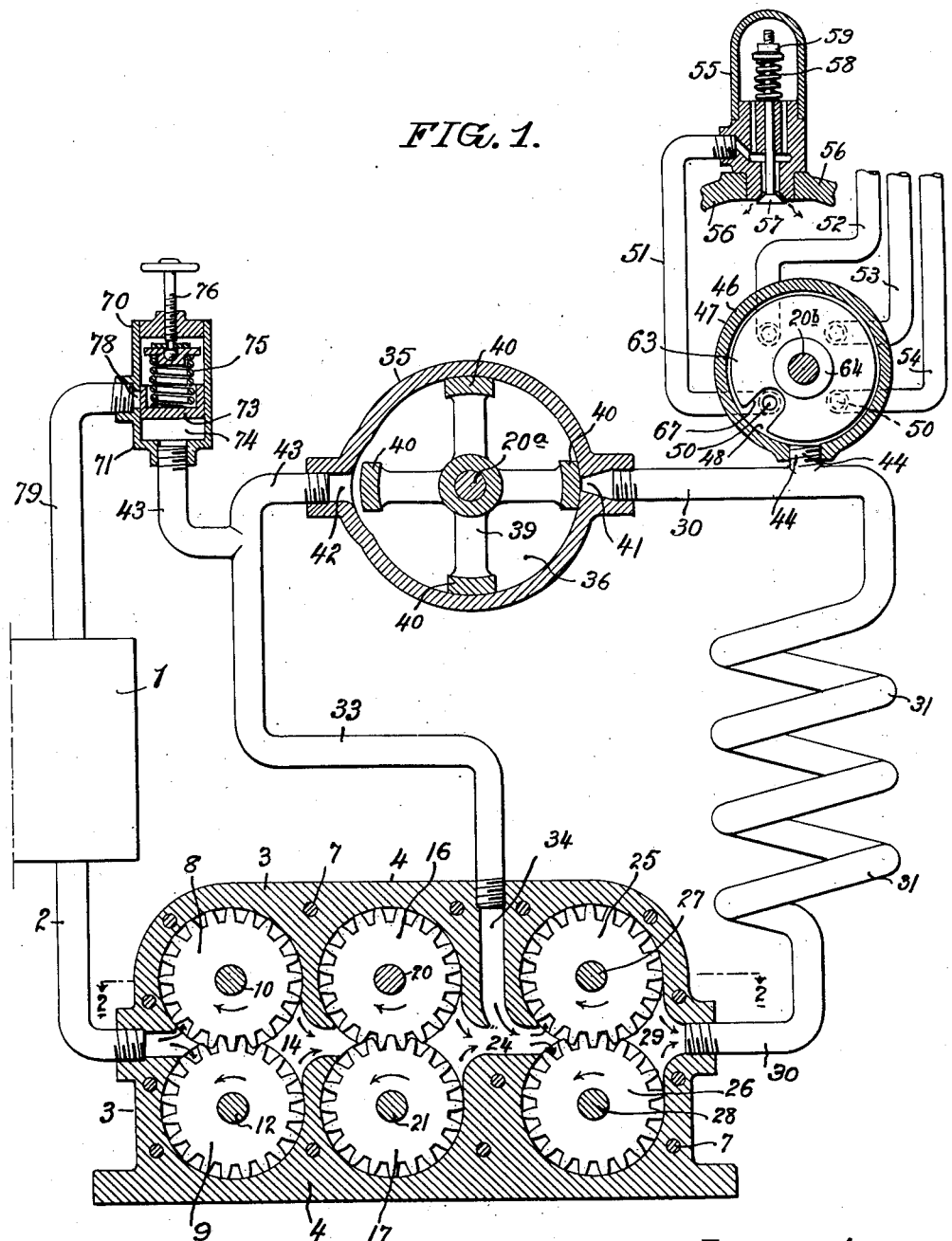
Figure 2:
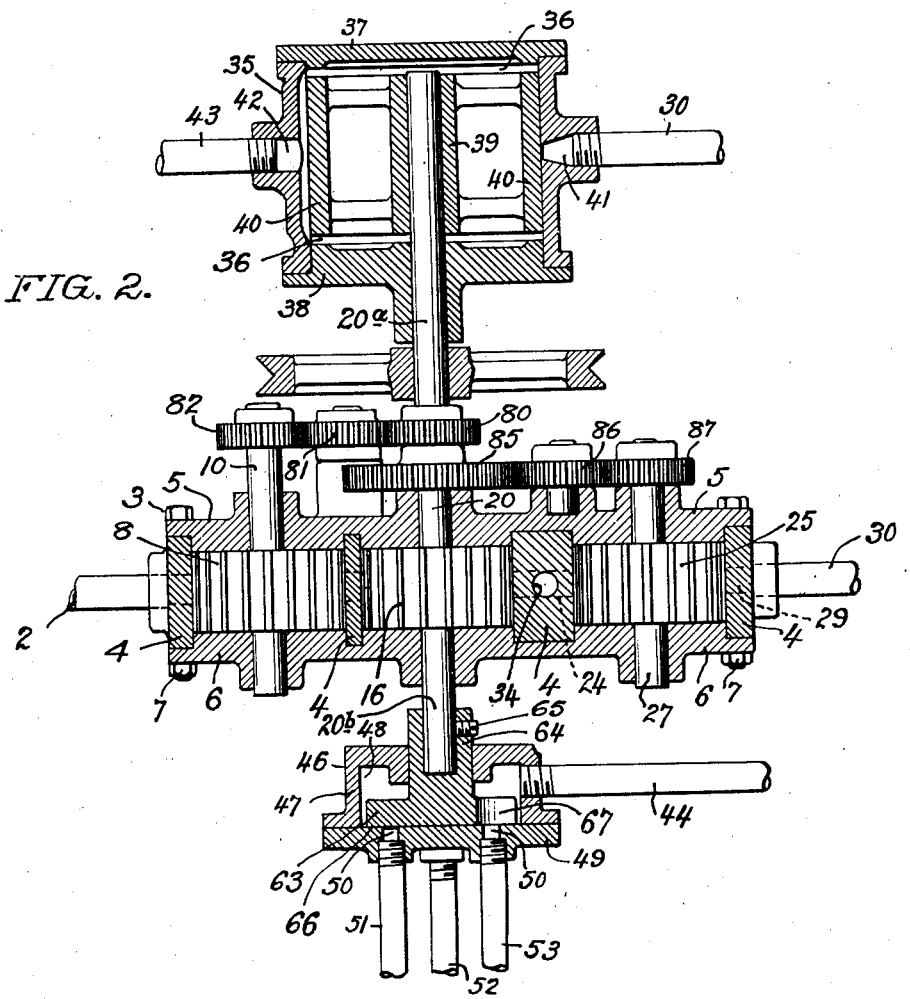

Referring to the accompanying drawings Fig. 1 is a diagrammatic view of the apparatus showing the various devices in vertical section; which constitute my improved pressure supply apparatus; and Fig. 2 is an assembled view showing the distributor, and the interrupter in horizontal section, and the pumps in section, as on line 2—2, Fig. 1, illustrating one form or embodiment of my invention.

In the accompanying drawings in which like reference characters refer to like parts, 1 represents a fuel supply tank, having a pipe 2 connected with a pump casing 3, comprising a body 4 and side walls 5 and 6 secured together by bolts 7. Within the body 4 of the casing 3 are rotatably mounted a pair of pump gears 8 and 9, which are secured upon shafts 10 and 12, rotatably mounted in bearings formed upon the side walls 5 and 6 of the casing 3. Upon the gears 8 and 9 are teeth which tightly intermesh. Said gears 8 and 9 fit tightly in the cylindrical chambers formed in the casing 3 so that the teeth will carry the fuel from the pipe 2 around the gear chambers in the directions indicated by the arrows and discharge the fuel to the intermediate passageway 14 formed in the body 4 of the casing. A second set of gears 16 and 17 are rotatably mounted upon shafts 20 and 21, which are rotatably mounted in the casing 3.

The gears 16 and 17 form a second pump for further increasing the pressure of the fuel above the pressure imposed by the gears 8 and 9. Additional pairs of gears may be provided for adding additional stages to the pump for boosting the pressure to the desired point.

The casing 3 is provided with a passageway 24 leading from the discharge side of the gears 16 and 17, as indicated by the arrows. The fuel passes through the passageway 24 and is subjected to the action of another pair of gears 25 and 26 mounted upon shafts 27 and 28, which are rotatably mounted in the casing 3. The gears 25 and 26 are operated at a high speed and form a velocity pump for circulating the fuel at a high velocity through a reservoir consisting of the pipe 30, which is connected with the discharge outlet 29 formed in the pump body 4. Said pipe 30 is provided with coils 31 for increasing the length of the reservoir through which the fuel is forced at a high velocity and is returned to the pump casing 3 through the return pipe 33, which also forms part of the reservoir. The pipe 33 is connected with a passageway 34 formed in the body 4 which communicates with the passageway 24, thus returning the unused fuel to the velocity gears 25 and 26.

The pipes 30 and 33 are connected with opposite sides of an interrupter consisting of a casing 35, having a cylindrical chamber 36, between the end heads 37 and 38, the latter forming a bearing for the portion 20a of the drive shaft 20. A rotor 39 having one or more blades 40, is secured upon the shaft 20a and adapted to fit tightly against the inner cylindrical surface of the casing 35. The casing 35 is provided with an inlet aperture 41, which communicates with the pipe 30 and permits the fuel to flow from the pipe 30 to the chamber 36, from which it is permitted to flow through an outlet aperture 42, formed in the casing 35. An outlet pipe 43 is connected with the casing 35 and is also connected with the return pipe 33.

A branch pipe 44 is connected with the pipe 30, at a point between the interrupter 35 and the reservoir coils 31. The pipe 44 is connected with a distributor 46 consisting of a casing 47 in which is provided a cylindrical chamber 48. An end plate 49 is secured upon the casing 47, having a number of openings 50 formed therein, corresponding to the number of cylinders included in the engine. Pipes 51, 52, 53, and 54 are shown connected with the openings 50 in the end plate 49. Said pipes are each connected with a nozzle 55 for supplying the fuel to the different cylinders of the engine. A nozzle 55 is shown upon a portion of a cylinder 56 and shown connected with the pipe 51. The nozzle 55 is provided with a valve 57 held closed by a spring 58, the tension of which may be adjusted by the nut 59, so that the valve 57 will open at a given pressure in the supply pipe 51. The distributor 46 is provided with a head 63 formed upon a sleeve 64 extending through the casing 47 of the distributor and adjustably secured upon a portion 20b of the drive shaft 20, by a fastening device 65. Said head has an end facing surface 66 which fits against the end plate 49 and is adapted for closing the openings 50 formed in the end plate. Said head 63 is provided with a recess 67, which registers with the openings 50, as the head is rotated by the drive shaft 20b, thus allowing the fuel to pass from the chamber 48, through the outlet openings 50 and through the pipes 51 to 54 for distributing the fuel to the nozzles 55 of different cylinders of the engine at the proper time for injection fuel into the cylinders. By means of the fastening device 65, the head 63 may be adjusted radially upon the shaft 20b for varying the position of the recess 67 in the head relatively to the openings 50 in the end plate 49.

A regulator 70 is connected with the pipe 43, which forms a branch leading from the return pipe 33. Within the casing 71 of the regulator is slidably mounted a piston 73 which forms a chamber 74 adjacent to the end of the casing 71 at which the pipe 43 is connected. The piston 73 is provided with a spring 75 and an adjusting screw 76 rotatably mounted in the casing 70, for regulating the tension of the spring 75 for controlling the movements of the piston 73 when the chamber 74 is filled with fuel, the pressure of which tends to move the piston against the spring.

The regulator casing 70 is provided with an overflow opening 78 connected with a pipe 79, which in turn is connected with the supply tank 1, through which pipe 79 any excess fuel in the chamber 74 of the regulator may be released when the pressure is sufficient to move the piston 73 against the action of the spring 75 and open the overflow outlet 78.

The pumps, the interrupter and the distributor may be driven by independent means. In Fig. 2, I have shown an embodiment of my invention in which a common drive shaft is employed for operating the above devices. Fig. 2 shows the pump gear 16 secured upon the shaft 20 and the gear 8 is driven by a gear wheel 80, secured upon the shaft 20, meshing with an idler wheel 81 which meshes with a gear wheel 82 secured on the shaft 10. The pump gear 25 is driven by a large gear wheel 85 secured upon the shaft 20, and meshes with an idler wheel 86, which meshes with a gear wheel 87 secured upon the shaft 27 on which the gear 25 is secured. Said gear wheel 87 is smaller than the wheel 85 for rotating the shaft 27 and the pump gears 25 and 26 at a higher speed. The interrupter, the distributor and pumps may be enclosed in a single casing instead of in separate casings, and various other changes in the construction and arrangement of the parts may be made, without departing from my invention.

The operation of my invention is as follows:

The fuel is supplied from the tank 1 to the pump gears 8 and 9 for increasing the pressure of the fuel, which is discharged to the pump gears 16 and 17, for further increasing the pressure of the fuel and delivering it through the passageway 24 to the velocity pump gears 25 and 26, which impart a high velocity to the fuel, forcing it through the circulating reservoir pipe 30, the interrupter chamber 36, and the return pipe 33, which delivers the unused fuel to the passageway 24 formed in the casing 3, through which passageway it is again directed and acted upon by the velocity gears 25 and 26, thus imparting a high velocity to the fuel at the pressure imparted to it by the pump gears 8 and 9, 16 and 17. When the rotor 39 is in a position so that one of the blades 40 will cover the inlet aperture 41 formed in the casing 35, the flow of the fuel through the aperture 41 will be interrupted, thus causing the pressure in the pipe 30 to be suddenly increased. The distributor 46 is so timed that the proper aperture 50 in the end plate 49 of the casing will be opened by the recess 67 in the rotor 63 registering with the aperture 50, thus allowing the fuel to be discharged through the proper aperture 50 and the pipes 51 to 54 each leading to one of the fuel nozzles 55. The sudden interrupting of the speed at which the fuel is circulating through the reservoir pipe 30, causes an impact pressure at the inlet 41 of the interrupter, which is caused by the stopping of the weight of the oil in the reservoir 30, circulating at a certain speed, and in addition to that an increase of pressure in the reservoir, or pipe 30, is also caused by the amount of fuel supplied by the velocity pump gears 25 and 26 during the time the inlet 41 is closed by the blade 40, which stops the flow of fuel in the pipe 30 causing an increase of pressure in the pipe 44 and the nozzle 55 which is sufficient to open the valve 57 against the action of the spring 58, thereby discharging the fuel through the valves 57 to the respective cylinders. At the moment the rotary blade 40 closes the aperture 41, the pressure in the chamber 36, of the interrupter and in the return pipe 33 would be reduced, but the reduction is compensated for by the spring actuated plunger 73, thus causing the fuel in the regulator chamber 74 to flow through the pipes 43 and 33 to the velocity pump gears 25 and 26 without causing any interruption, or great change in the pressure, of the fuel in the return pipe 33. Any excess pressure created by the pump gears 8, 9, 16, and 17 will cause the piston 73 to move upwardly and allow the fuel to pass through the aperture 78 of the regulator 70 and return through the pipe 79 to the supply tank 1. By means of the adjusting screw 76, in the regulator 70, the fuel in the supply passageway 24, in the pump casing, may be maintained at any desired pressure, which pressure is below that required for opening the valve 57 of the nozzle 55. The velocity pump gears 25 and 26 impart a high velocity to the fuel at the given pressure, and the interrupter causes the sudden stopping of the circulation of the fuel, thereby increasing the pressure sufficiently to open the valve 57 and inject the fuel into the cylinder of the engine.

The amount of fuel injected through the nozzle 55 may be further regulated by the adjustment of the tension upon the spring 75 of the regulator. By increasing the tension upon the spring 75, the pressure in the entire system is increased by the pump gears 8, 9, 16 and 17. The impact pressure created by the interrupter blade 40 in the circulation of the fuel in the reservoir or pipe 30 will remain the same. The total pressure at the nozzle 55, however, is increased in the same proportion which the pressure in the entire system has been increased by the adjustment of the tension of the spring 75 in the regulator. By this means the available pressure at the injection nozzle may be regulated for injecting more or less fuel into the cylinders, thereby providing means by which the speed and power of the engine may be varied.

I claim:

1. A fuel supply apparatus comprising a fuel reservoir, means for maintaining fuel at a pressure within the supply reservoir, a circulating reservoir connected with the supply reservoir, a pressure actuated fuel injection nozzle connected with the circulating reservoir normally closed to retain the normal pressure within the circulating reservoir, means for circulating the fuel within the circulating reservoir at high velocity, means for suddenly interrupting the circulation of the fuel within the circulating reservoir whereby to transform kinetic energy of said fuel to static pressure thereby to increase the pressure on said fuel to produce an impact sufficient to open said nozzle, and a pressure regulator connected with the supply reservoir.

2. A fuel supply apparatus comprising a circulating reservoir, means for supplying fuel at a uniform pressure to said reservoir, means for circulating the fuel through the circulating reservoir at a high velocity, a cylindrical casing having inlet and outlet apertures formed therein connected with the circulating reservoir, a rotor mounted within the casing for closing said inlet aperture for interrupting the circulation of fuel through the circulating reservoir for increasing the pressure in the latter by a transformation of kinetic energy in the fuel to static pressure, a fuel injection nozzle connected with the circulating reservoir normally closed against the normal pressure within the circulating reservoir and opened by the increased pressure when the pressure in the latter is increased by the interruption of the fuel circulating therein.

3. A fuel supply apparatus comprising a supply reservoir, a circulating reservoir connected with the supply reservoir, a velocity pump connected with the circulating reservoir for circulating the fuel in the latter reservoir at a high velocity in one direction, a casing having inlet and outlet apertures connected with the circulating reservoir, a rotor mounted within the casing for intermittently closing said inlet aperture, a pressure actuated fuel injection valve, and a connection between said valve and the circulating reservoir at a point between said pump and said casing.

4. A fuel supply apparatus comprising a supply reservoir, a pressure pump operatively connected in said supply reservoir, a regulator connected with the pump for maintaining a normal pressure in said reservoir, a velocity pump connected with the outlet side of the pressure pump, a circulating reservoir connected with the outlet side of the velocity pump, a pressure actuated fuel injection nozzle connected with the circulating reservoir for retaining the normal pressure in the latter, an interrupting device connected with the circulating reservoir at a point beyond the nozzle relatively to the velocity pump, a return pipe connection between the interrupting device and the connection between the pressure pump and the velocity pump, and means for operating the interrupting device for suddenly stopping the flow of fuel through the circulating reservoir whereby to transform kinetic energy in said fuel to static pressure and increase the pressure on said fuel sufficiently to open said nozzle.

5. A fuel supply apparatus comprising a circulating reservoir, a supply reservoir connected with the circulating reservoir for supplying fuel to the latter, a pump connected with the circulating reservoir for circulating the fuel in the latter reservoir at high velocity in one direction, a pressure actuated fuel injection valve connected with the circulating reservoir and normally closed for retaining the normal pressure within the circulating reservoir, a casing having inlet and outlet apertures formed therein connected in the circulating reservoir at a point between the connection with said nozzle and said pump, and a rotor within said casing adapted for intermittently closing said inlet aperture of the casing for stopping the circulation in the circulating reservoir thereby to change kinetic energy in said fuel to static pressure to increase the pressure in said circulating reservoir sufficiently to open said nozzle.

6. A fuel supply apparatus comprising a supply reservoir, a pressure pump operatively associated with said supply reservoir for maintaining a normal pressure therein, a velocity pump connected with the outlet side of the pressure pump, a circulating reservoir connected with the outlet side of the velocity pump, a pressure actuated fuel injection nozzle connected with the circulating reservoir for retaining the normal pressure in the latter, an interrupting device connected with the circulating reservoir at a point beyond the nozzle relatively to the velocity pump, a return pipe connection between the interrupting device and the connection between the pressure pump and the velocity pump, and means for operating the interrupting device for suddenly stopping the flow of fuel through the circulating reservoir whereby to change kinetic energy in said fuel to static pressure and increase the pressure on said fuel sufficiently to open said nozzle.

7. A fuel supply apparatus comprising a supply reservoir, a pressure pump connected therewith, a circulating reservoir connected with the pressure pump, a velocity pump connected in the circulating reservoir for circulating the fuel in the latter at a high velocity in one direction, an interrupting device connected in the circulating reservoir adapted for interrupting the circulation of fuel in the latter reservoir for suddenly increasing the pressure therein by a transformation of kinetic energy in said fuel to static pressure, a distributor having a plurality of outlet pipes connected therewith, an inlet pipe connected between the distributor and the circulating reservoir between the velocity pump and the interrupting device, and a pressure actuated fuel injection nozzle connected with each outlet pipe from the distributor adapted to be opened when the pressure in the circulating reservoir is increased by the interrupting device.

8. A fuel supply apparatus comprising a fuel supply reservoir, a pressure pump connected therewith, a pressure regulator, a return pipe between the pump and said regulator, an overflow pipe between the pressure regulator and the supply reservoir, a velocity pump connected with the outlet side of the pressure pump, a pipe connected with the outlet side of the velocity pump forming a high velocity circulating reservoir, an interrupter casing having an inlet aperture formed therein to which said last mentioned pipe is connected, said casing having an outlet aperture formed therein, a pipe connecting said outlet aperture with the inlet side of the velocity pump thereby forming a closed circulating system, means within said interrupter casing for intermittently closing said inlet aperture for interrupting the circulation of fuel in the circulating reservoir pipe for the purpose of changing the kinetic energy in said fuel to static pressure, a distributor casing having a plurality of outlet pipes connected therewith, a pipe connecting the distributor casing with said circulating reservoir adjacent to the interrupter casing, means within the distributor casing for successively opening and closing said outlet pipes, and pressure actuated fuel injection nozzles connected with said outlet pipes.

9. A fuel supply apparatus comprising a supply tank, a pressure pump connected with said tank, a pressure regulator, a return pipe connected between the regulator and the pressure pump, an overflow pipe connected between the regulator and the supply tank, a velocity pump connected with the pressure pump and with said return pipe, a circulating reservoir connected with the pressure pump, a casing connected with the circulating reservoir, a member rotatably mounted in the casing for interrupting the circulation of fuel in the circulating reservoir for suddenly increasing the pressure therein by transforming kinetic energy in said fuel to static pressure, a distributor casing having a plurality of outlet pipes connected therewith, an inlet pipe connected between the distributor and the circulating reservoir, a member rotatably mounted within the distributor casing for opening and closing said outlet pipes successively, a fuel injection nozzle connected with said outlet pipes, and a spring actuated valve in the nozzles adapted to open when the pressure in the circulating reservoir is suddenly increased by said interruption.

MAX GEORGE FIEDLER.